Dec. 8, 1970     A. W. RIHACZEK     3,546,700

RADAR BEAM DEFLECTION SYSTEM

Filed April 10, 1968

PRIOR ART

INVENTOR.
AUGUST W. RIHACZEK
BY Harry A. Herbert Jr
Julian L. Siegel and
ATTORNEYS

United States Patent Office 3,546,700
Patented Dec. 8, 1970

3,546,700
RADAR BEAM DEFLECTION SYSTEM
August W. Rihaczek, Rolling Hills, Calif., assignor to the United States of America as represented by the Secretary of the Air Force
Filed Apr. 10, 1968, Ser. No. 721,139
Int. Cl. H01q 3/26
U.S. Cl. 343—100     3 Claims

ABSTRACT OF THE DISCLOSURE

A Chirp radar deflection and steering system having a series of antennas with each antenna having a signal phase difference controlled by mixers in each antenna line with each mixer fed by a succession of signals, the signals being a sequence of harmonics of a particular fundamental frequency. All lines are then fed into a matched-filter.

BACKGROUND OF THE INVENTION

As radar antennas have increased in size, mechanical scanning methods have become impractical in many applications. This has led to an increasing use of array antennas where the required flexibility is achieved by electronic means of beam scanning. Such antennas offer the additional advantage of permitting the formation of an almost unlimited number of simultaneous antenna beams to cover a large portion of space without any scanning.

The beam pointing direction for an array antenna is determined by the requirement that the total signal delay between a target and a receiver common to all array elements is the same, no matter through which array element the signal enters. Hence, by incorporating artificial delays into the feed lines of the individual elements, the beam-pointing direction can be changed at will.

Since, for a given frequency, the signal delay can be measured in terms of the RF phase, the most common method of accomplishing beam steering is to introduce phase shifts into the feed lines for the array elements. With one method, actual phase shifters are used to deflect the beam off broadside. However, since instantaneous frequency is the time derivative of phase, a phase shift that is linearly increasing with time can be simulated by a constant frequency signal. Introducing such signals into the feed lines produces a scanning beam. These approaches, through basically simple, suffer from the disadvantage of being restricted to narrow band signals. If wide band signals are to be accommodated, a true signal delay is needed rather than a phase shift, which results in a requirement for wide band width delay lines with taps or continuously variable delays. Unfortunately, it is extremely difficult and costly to provide precision delay lines with the required properties for all elements of an array antenna, and particularly for the wide band signals used in high resolution radars.

SUMMARY OF THE INVENTION

The present invention describes a novel system of implementing the technique by using true signal delays for beam steering and multiple beam forming. Compared to the known schemes of beam steering and multiple beam forming by the use of delay lines in the feed lines for the array elements, this novel method can be used in applications where the usual approaches would lead to systems of impractical complexity. The invention is limited to radars using linear FM, also called Chirp signals, or a combination of these Chirp signals. Because of the almost universal use of Chirp-type signals in practical high resolution radar, the invention has wide applicability in practice. The matched-filter for a Chirp signal can be a high precision dispersive delay line with linear relation between frequency and delay, and consequently with this invention it is unnecessary to use a large number of additional delay lines for the purpose of beam forming and beam steering. To achieve the required signal delay in each feed line, there is incorporated a translation of the center frequency of the signal, which through the very action of the matched-filter will be transformed into the desired time shift of the signal. This means that the delay lines can be replaced by mixers that translate each signal by the required amount in frequency. Such mixers are already present in each system for the translation of the RF signal down to lower frequencies for processing, so that it is only necessary to vary the amount of frequency translation in each feed line.

It is an object of the invention to provide a novel high resolution radar beam deflection and steering system.

It is another object to provide a beam steering and multiple beam forming system that avoids the use of expensive delay lines.

It is still another object to provide a beam steering signal that uses true signal delays and is not restricted in use to narrow band signals.

DESCRIPTION OF THE DRAWINGS

The aforementioned objects will become more apparent from the description of the preferred embodiment in the accompanying drawings, wherein.

DESCRIPTION OF THE PREFERRED EMBODIMENT

Figure 1:
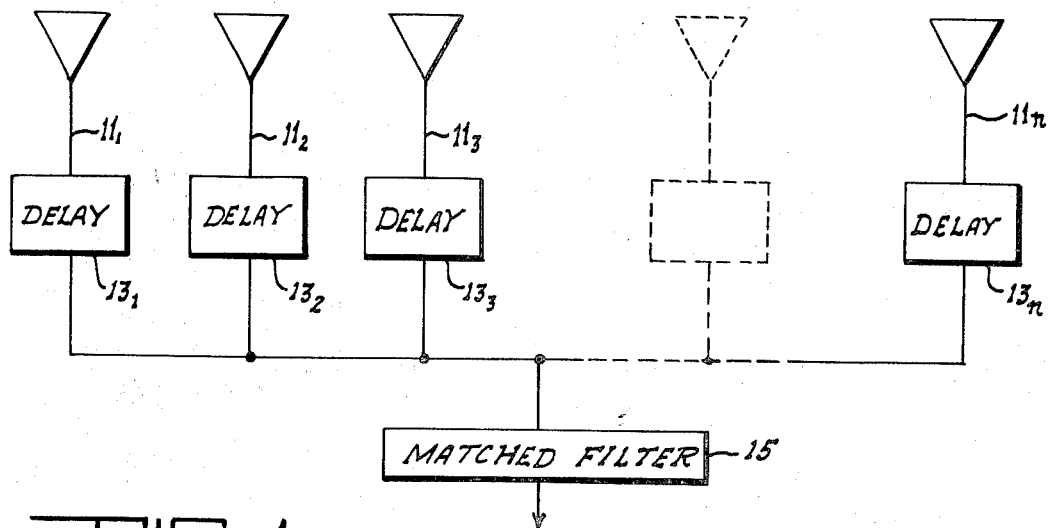
FIG. 1 is a schematic diagram of a phase array system of the prior art.

Referring to FIG. 1, there is shown an antenna system for a Chirp radar system where beam forming and beam steering are accomplished by use of time delay elements $13_1$ to $13_n$ in each feed line of antennas $11_1$ to $11_n$. When all delays are equal (or zero) the beam points to the broad side. If the delay is linearly increasing from the left to the right elements, the beam is squinted to the right, and vice versa. The extension to two-dimensional arrays is evident and well known. All feed lines are brought together so that the combined signal may be passed through the matched-filter 15, or a correlator can be used. The following discussion is given in terms of a matched-filter but applies equally if an active correlator is used instead of the passive filter. The advantage of the Chirp signal is that a filter matched to the transmitted signal will stay matched and will properly compress the received signal even if its center frequency is arbitrarily shifted by the Doppler-effect for a moving target. Practically, this means that the receiver need use only one matched-filter regardless of what the target range rate may be. The same property of a Chirp signal which permits simplification of the pulse compression receiver can also be used for simplification of the beam steering and multiple beam forming mechanism in array radars.

Figure 2:
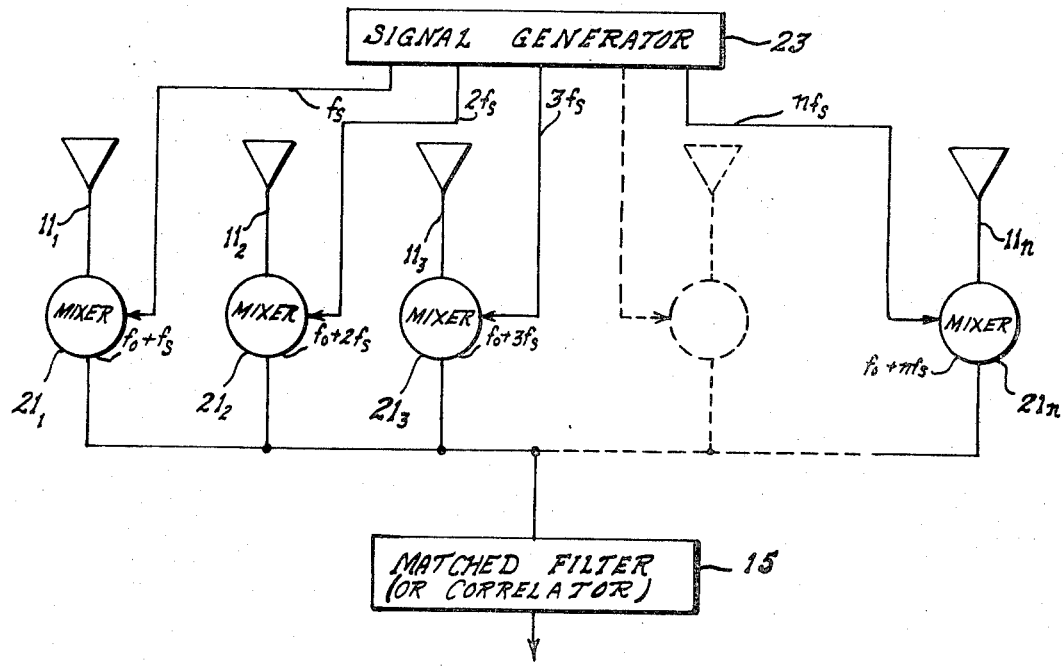
FIG. 2 is a schematic diagram showing an embodiment of the invention.

The basic circuit of the invention shown in FIG. 2 shows an array of antennas $11_1$ to $11_n$. To achieve linear delay variation from one antenna feed line to the next, the frequency translation should vary linearly from one feed line to the next, which is achieved by generating a fundamental signal of frequency $f_s$ and its harmonics from signal generator 23. Mixers $21_1$ to $21_n$ mix radar frequency $f_0$ with the harmonics. Matched-filter 15 which is conventional connects the mixers. The amount of incremental frequency translation $f_s$ determines the squint angle $f$ for the fixed beam, which is in contrast to the frequency scanning method where the incremental frequency translation determines the sweep frequency of a scanning beam. If the matched-filter is replaced by an active correlator, a frequency translation of the signal is again transformed into a time shift, with the same results as in the case of the matched-filter.

The present invention has a wide application for squinting the beam by changing the incremental frequency shift, $f_s$, or for forming several stationary beams by channelizing each feed line to permit inclusion of several distinct frequency shifts. The system can evidently be extended to two-dimensional arrays and two-dimensional scanning and beam patterns by techniques well known to the art. All the advantages and consequences from the use of true delay elements thus apply, but the actual delay elements can, by the principle of this invention, be replaced by the already present pulse compression network and suitable frequency translations.

Although the invention has been described with reference to a particular embodiment, it will be understood to those skilled in the art that the invention is capable of a variety of alternative embodiments within the scope and spirit of the appended claims.

I claim:
1. A system for radar beam steering and multiple beam forming for a Chirp radar system, comprising:
   (a) a plurality of antennas;
   (b) a plurality of mixers, one each connected to each of the plurality of antennas;
   (c) a matched-filter connecting each of the mixers:
   (d) and means for generating a fundamental frequency and the harmonics of the fundamental frequency, the generating means feeding the harmonics into each of the mixers in sequence.
2. A system for beam steering according to claim 1 wherein the matched-filter is a dispersive delay line.
3. A system for radar beam steering and multiple beam forming for a Chirp radar system, comprising:
   (a) a plurality of antennas;
   (b) a plurality of mixers, one each connected to each of the plurality of antennas;
   (c) a correlator connecting each of the mixers;
   (d) and means for generating a fundamental frequency and the harmonics of the fundamental frequency, the generating means feeding the harmonics into each of the mixers in sequence.

References Cited
UNITED STATES PATENTS

| | | | |
|---|---|---|---|
| 2,510,280 | 6/1950 | Goddard | 343—100 |
| 3,086,172 | 4/1963 | Johnson. | |
| 3,202,991 | 8/1965 | Howells | 343—100 |

RODNEY D. BENNETT, JR., Primary Examiner

T. H. TUBBESING, Assistant Examiner

U.S. Cl. X.R.
343—17.2, 854